United States Patent
Bakx

(10) Patent No.: US 8,223,595 B2
(45) Date of Patent: Jul. 17, 2012

(54) OPTICAL SCANNING DEVICE AND METHOD FOR SCANNING

(75) Inventor: Johannes Leopoldus Bakx, Taipei (TW)

(73) Assignee: Lite-On IT Corporation, Taipei (TW)

( * ) Notice: Subject to any disclaimer, the term of this patent is extended or adjusted under 35 U.S.C. 154(b) by 292 days.

(21) Appl. No.: 12/499,949

(22) Filed: Jul. 9, 2009

(65) Prior Publication Data
US 2010/0008195 A1    Jan. 14, 2010

Related U.S. Application Data

(60) Provisional application No. 61/134,597, filed on Jul. 11, 2008.

(51) Int. Cl.
*G11B 11/00* (2006.01)
(52) U.S. Cl. .................................. 369/13.33; 369/44.11
(58) Field of Classification Search ................. 369/13.33
See application file for complete search history.

(56) References Cited

U.S. PATENT DOCUMENTS

| 7,394,734 | B2 * | 7/2008 | Ishimoto | 369/44.35 |
| 7,406,016 | B2 * | 7/2008 | Ishimoto | 369/44.35 |
| 7,791,986 | B2 * | 9/2010 | Koyama et al. | 369/13.33 |
| 2001/0021145 | A1 * | 9/2001 | Ichimura et al. | 369/43 |
| 2002/0163869 | A1 * | 11/2002 | Ishimoto | 369/53.37 |
| 2005/0190666 | A1 * | 9/2005 | Ishimoto | 369/44.25 |
| 2007/0217300 | A1 * | 9/2007 | Koyama et al. | 369/44.23 |

FOREIGN PATENT DOCUMENTS
WO  WO 2006018749 A1 *  2/2006
WO  WO 2007108635 A1 *  9/2007

* cited by examiner

*Primary Examiner* — Wayne Young
*Assistant Examiner* — Brenda Bernardi
(74) *Attorney, Agent, or Firm* — Thomas, Kayden, Horstemeyer & Risley, LLP

(57) ABSTRACT

An optical scanning device is adapted for scanning a record carrier having an outer face. The optical scanning device comprises a radiation source for generating a radiation beam, and an objective system having an exit face arranged for evanescent coupling of the radiation beam between the exit face and the outer face and for converging the radiation beam to a focus. A gap servo maintains a distance between the exit face and the outer face at a predetermined gap height. The optical scanning device includes a control unit for setting the predetermined gap height at at least two different values.

4 Claims, 3 Drawing Sheets

OPTICAL SCANNING DEVICE AND METHOD FOR SCANNING

CROSS REFERENCE TO RELATED APPLICATION

This application claims the benefit of priority under 35 U.S.C Section 119 from U.S. Provisional Patent Application Ser. No. 61/134,597, filed on Jul. 11, 2008.

FIELD OF THE INVENTION

The invention relates to an optical scanning device and a method for scanning an optical record carrier using the device.

BACKGROUND OF THE INVENTION

International patent application WO 2006/018749 discloses a near-field optical scanning device for scanning a record carrier. In a near-field optical scanning device a radiation beam is transmitted across a gap between an exit face of an objective system and an outer face of the record carrier using evanescent coupling of the radiation. A gap servo keeps the size of the gap during scanning at a distance of approximately 25 nm.

It is an object of the invention to provide an optical scanning device having an improved performance.

SUMMARY OF THE INVENTION

The object is achieved by an optical scanning device for scanning a record carrier, said record carrier having an outer face, wherein said optical scanning device comprises: a radiation source for generating a radiation beam; an objective system for converging the radiation beam to a focus, the objective system having an exit face arranged for evanescent coupling of the radiation beam between the exit face and the outer face; a gap servo for maintaining a distance between the exit face and the outer face at a predetermined gap height; wherein the optical scanning device includes a control unit for setting the predetermined gap height at at least two different values.

Known scanning devices using evanescent coupling use a single predetermined gap height for all scanning modes of operation, e.g. reading, writing, erasing and/or seeking. The value of the gap height is determined as a compromise between high evanescent coupling efficiency of radiation across the gap and reduced risk of collision between the objective system and the record carrier.

In contrast, the scanning device according to the invention uses different predetermined gap heights for different modes of operation. During these modes of operation the gap servo is preferably operating in closed loop. Different gap heights can be used, because the shape of the focus formed by the radiation beam hardly changes over a significant range of values of the gap height. Hence, the scanning resolution is affected only in a small degree by changing the gap height. The permitted changes in gap height increase the freedom of the scanning device to improve its performance in various modes of operation.

The at least two different values of the gap height are advantageously used for scanning modes of operation. During a scanning mode the scanning device acquires information about the location of tracks, e.g. for following a track during reading, writing or erasing and for counting the number of tracks during seeking. Examples of scanning modes are writing, reading, erasing and seeking. During a non-scanning mode no information about the location of tracks is acquired. An example of a non-scanning mode is where the scanning device merely reads changes in reflectivity of a record carrier without following tracks, which mode may be used for detecting relatively large bar codes embossed in a record carrier. In a specific embodiment of the scanning device the different values of the gap height relate to scanning modes of operation and do not include values for non-scanning modes of operation.

It should be noted that during loading a record carrier in the scanning device and removing a record carrier from the device and in an idling mode the objective system is in a non-scanning parking position, where the gap height is not controlled by the gap servo operating in closed loop. Hence, the gap height in this mode of operation is not a 'predetermined gap height' according to the invention.

In a special embodiment of the scanning device the control unit selects a first value for the gap height for writing information on the record carrier and a second value for the gap height for reading information from the record carrier, the first value being smaller than the second value. The first value may also be used for erasing information. On some record carriers, such as phase-change record carriers, a so-called direct overwrite may be used, in which a write operation automatically erases information recorded previously. When writing information, the evanescent coupling efficiency should be high to have as much power as possible in the focus for fast and reliable writing of information in the record carrier. The gap height for this mode of operation will be relatively small and may be substantially equal to the gap height of known scanning devices, e.g. 30 nm.

When reading information recorded on the record carrier, the power required in the focus is lower than for writing. The power in the focus during reading is limited by the so-called repeated read requirement, which entails that the power in the focus must be so low that the information can be read at least a minimum number of times, e.g. $10^6$ times, without degradation of the recorded information. This maximum power is indicated as Pmax. In known scanning devices the power of the radiation source therefore is set at a level such that the power in the focus is below Pmax.

In the scanning device according to the invention the gap height during reading may be larger than during writing. At a larger gap height the evanescent coupling is smaller. When for example the gap height is increased from 30 to 100 nm in a particular embodiment of the scanning device, the attenuation of the gap increases by a factor of about two. Hence, to achieve a power in the focus just below Pmax, the power emitted by the radiation source must be higher at a larger gap height than at a smaller gap height. During reading, the radiation source in a scanning device according to the invention is used at a higher power level than in a prior art scanning device to obtain the same power in the focus. Since the signal-to-noise ratio of the laser, the so-called RIN, is higher at higher power, the signal-to-noise ration (SNR) of the information signal is improved. A factor of two increase in power gives a substantial improvement in RIN. In this embodiment of the scanning device the gap is used as an adjustable attenuator.

In another special embodiment of the scanning device the control unit selects a first value for the gap height for reading and/or writing information on the record carrier and a second value for the gap height for seeking a scanning position of the focus on the record carrier, the first value being smaller than the second value.

In a seek mode of operation the scanning position of the focus on the record carrier changes. The seek mode is one of the steps in a process of accessing a record carrier, wherein information must be written or read at a desired location on a track. The access process usually involves the following three subsequent steps: a seek step, a scanning delay step and a transfer step. During the seek step the objective system is moved to the track where the information should be written or where the information to be read is recorded. The seek mode usually involves a fast movement of the objective system across the tracks, controlled by a transverse servo. In the scanning delay step the objective system follows the track to the desired location on the track. During the transfer step the information is written in the track or read from it.

The increased gap height during the seek step will decrease the risk of collision between the objective system and the record carrier when the objective system is moved at high speed over the record carrier. The quality of the focus may be lower than allowed for writing or reading information to allow proper acquisition of signals from the record carrier used for controlling the change in position.

In a further special embodiment of the scanning device the control unit selects a first value for the gap height for writing information on the record carrier, a second value for the gap height for reading information from the record carrier, and a third value for the gap height for seeking a scanning position of the focus on the record carrier, the first value being smaller than the second value, and the second value being smaller than or equal to the third value.

During the seek step, the gap height is preferably larger than the gap height used for writing to reduce the risk of collision. The larger gap height for reading may advantageously be used. In a preferred embodiment the gap height for seeking is larger than that for reading to reduce the risk of collision even further. The larger gap height for seeking may reduce the quality of the focus. However, the signals for controlling the change in position do not require such a high signal-to-noise ratio as the signal for reading information and some degradation of the spot will not affect the control of the change in position of the objective system.

A further aspect of the invention relates to a method for scanning an optical record carrier, comprising the following steps: converging a radiation beam to a focus by an objective system, the radiation beam being evanescent coupled between an exit face of the objective system and an outer face of the record carrier; maintaining a distance between the exit face and the outer face at a predetermined gap height; selecting the gap height from at least two different values in dependence on a mode of operation of the scanning device.

In a special embodiment of the method the mode of operation is writing information, reading information or seeking a scanning position.

Further features and advantages of the invention will become apparent from the following description of preferred embodiments of the invention, given by way of example only, which is made with reference to the accompanying drawings.

DETAILED DESCRIPTION OF THE INVENTION

Figure 1:
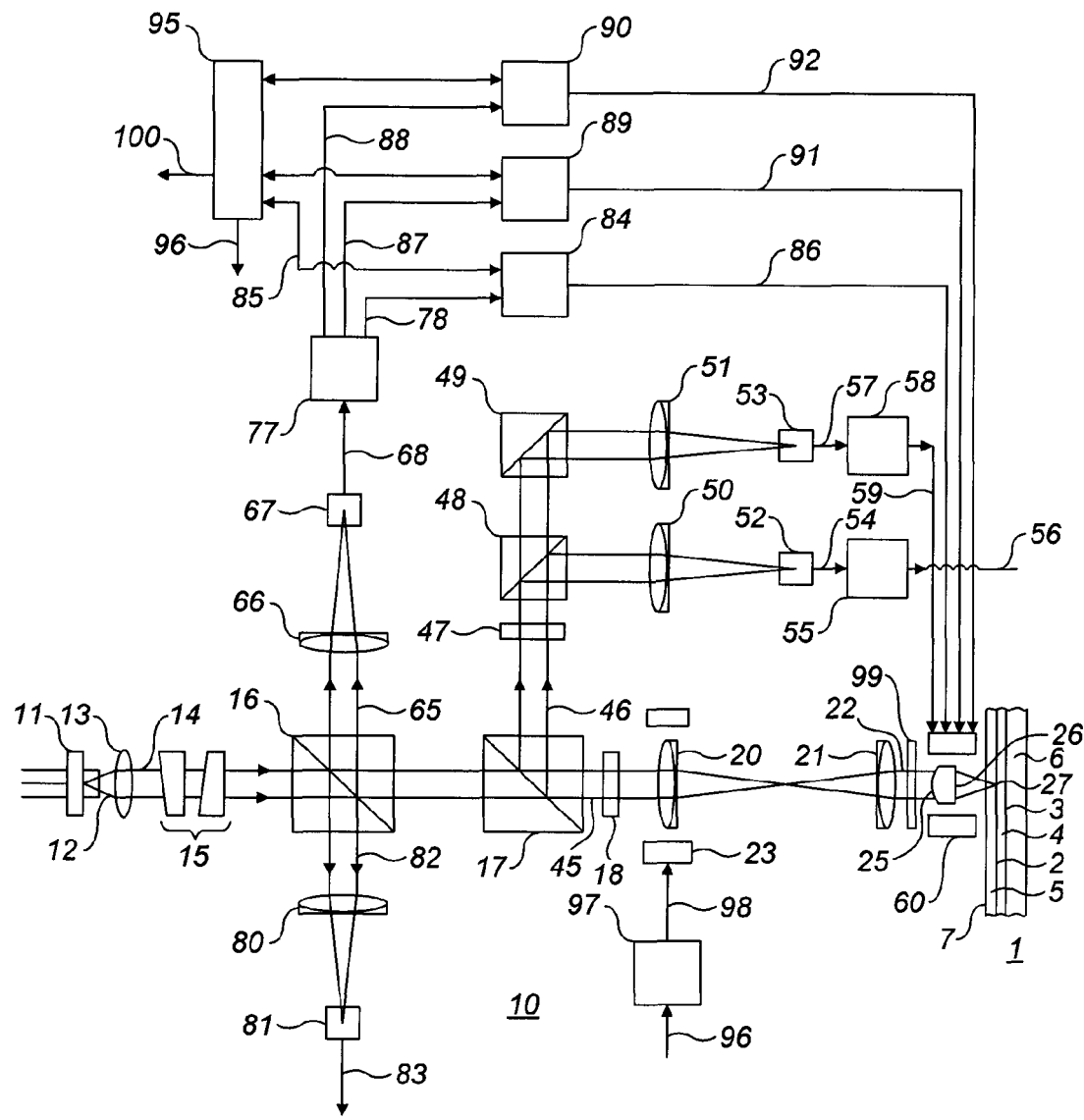
FIG. 1 shows schematically a record carrier and an optical scanning device in accordance with an embodiment of the invention.

FIG. 1 shows schematically a record carrier and an optical scanning device for scanning a record carrier in accordance with an embodiment of the present invention.

The record carrier may be of a single-layer or a multi-layer type. The Figure shows a record carrier 1 of a multi-layer type, having two information layers 2 and 3 separated by a spacer layer 4. The information layer 2 may be protected from environmental influences by a cover layer 5, but the cover layer may also be absent. The information layers are arranged on a substrate 6, providing mechanical support for the layers. An outer face 7 of the record carrier faces the scanning device.

User information may be arranged in tracks in the information layers of the record carrier. For a disc shaped record carrier each of the tracks forms a 360° turn of a spiral. The tracks may include land and groove portions. The information is coded in the form of information areas having properties different from the surrounding areas to allow optical detection of the information areas. The properties may be e.g. reflectivity or magnetization. The information may also be organized in tracks without land and groove portions, the information areas themselves defining the tracks.

The scanning device 10 comprises a radiation source 11, which may be a semiconductor laser, for generating a radiation beam 12, having a wavelength of e.g. 405 nm. A collimator lens 13 transforms the diverging radiation beam from the radiation source to a collimated beam 14. A beam shaper 15 may be arranged in the radiation beam to give the radiation beam a circular cross-sectional profile. The collimated beam 14 passes through a non-polarizing beam splitter 16 and a polarizing beam splitter 17. An optional quarter-lambda plate 18 changes an incoming linear polarization of the radiation into a circular polarization. The collimated beam passes through a telescopic system formed by a first focus adjustment lens 20 and a second focus adjustment lens 21. When the two lenses are in a neutral position, a radiation beam 22 leaving the telescopic system is collimated. The axial position of the first lens 20 can be changed by an actuator 23. A change away from the neutral position changes the vergence of the radiation beam 22.

The radiation beam 22 is incident on an objective system 25, which converges the radiation beam to a focus 27 for scanning the information layers 2, 3 of the record carrier 1. Although the objective system is shown as a single lens in FIG. 1, it usually comprises at least two lenses. A change in vergence of the radiation beam 22 changes the axial position of the focus.

Figure 2:
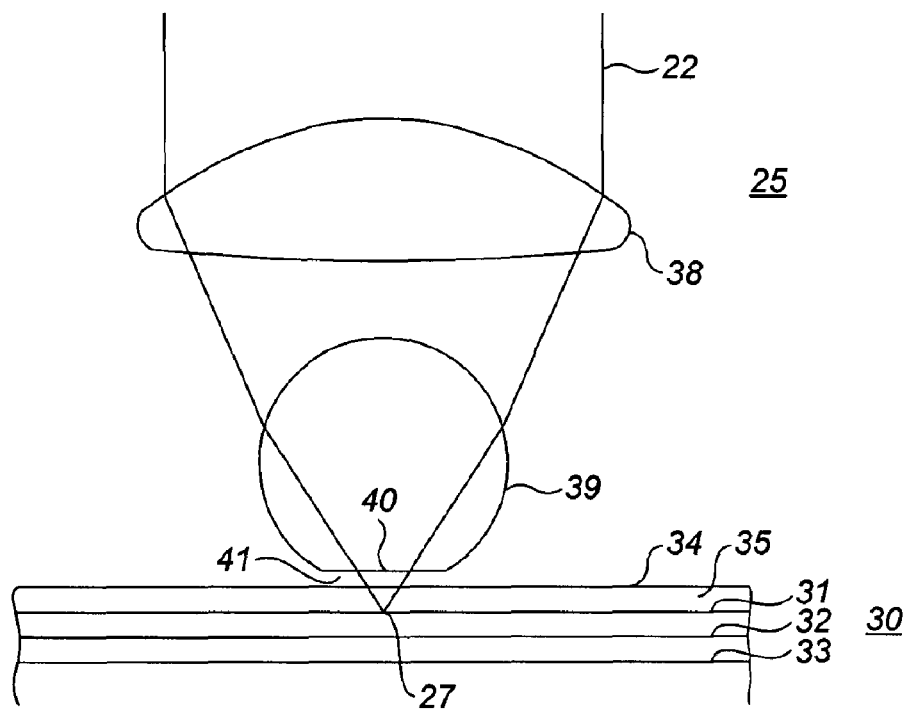
FIG. 2 shows an enlarged view of the objective system of the scanning device.

FIG. 2 shows an enlarged view of the objective system 25 for converging the radiation beam 22 to the focus 27 in a record carrier 30 having three information layers 31, 32, 33. The record carrier has an outer face 34 facing the objective system. The information layers 31, 32 and 33 of the record carrier shown are arranged at a depth of 3, 5 and 8 micrometer below the outer face, respectively. The highest information layer 31 is covered by a cover layer 35. The objective system 25 comprises a lens 38 and a so-called solid immersion lens (SIL) 39. The SIL shown in the Figure is of the super-hemispherical type. The SIL has a flat exit face 40 which faces the outer face 34 of the record carrier, leaving a small gap 41 between the objective system and the record carrier. During operation the height of the gap is kept at a specific value. The short distance between the exit face in the outer face allows an evanescent coupling of radiation between the objective system and the record carrier, permitting the radiation beam to enter the record carrier with a numerical aperture (NA) larger than 1.

Referring again to FIG. 1, a returning beam 45, formed by radiation reflected by the record carrier 1 and the objective system 25, returns along the path of the radiation beam 22. If the radiation beam 12 from the radiation source having a first state of polarisation passes through the quarter-lambda plate 18, is reflected by the objective system and record carrier acting as a perfect mirror, and passes again through the quarter-wave plate, it will have a state of polarisation perpendicular to the first state. The polarising beam splitter 17 is configured to split off the component of the returning beam having this perpendicular state of polarisation in the form of a first detection beam 46. This component is primarily caused by reflection of the radiation beam 22 on the record carrier 1. Since the objective system and record carrier normally do not act as a perfect mirror, there will be a component of the returning beam 45 having the first state of polarisation; this component passes through the polarising beam splitter 17 on towards the non-polarising beam splitter 16.

The first detection beam 46 is analyzed in a first detection branch, which comprises a half-lambda plate 47, a polarising beam splitter 48, a non-polarising beam splitter 49, two detector lenses 50 and 51, a first detection system 52 and a second detection system 53. The half lambda plate 47 and the polarising beam splitter 48 adjust the distribution of radiation power over the detection systems 52 and 53. The polarising beam splitter 48 couples out part of the first detection beam, which part is converged by the detection lens 50 onto the first detection system 52. A detection signal 54 generated by the first detection system, also called the central aperture signal, represents information read by the radiation beam from the record carrier 1. The detection signal is processed in a signal processor 55, amongst others for decoding and error correction. The signal processor provides as output an information signal 56 representing in digital form the information coded in the information areas and read from the record carrier.

The part of the first detection beam 46 not deflected by the polarising beam splitter 48, is deflected by the non-polarising beam splitter 49 and converged by the detection lens 51 on to the detection system 53. The non-polarising beam splitter 49 may also be a mirror; alternatively, the detection lens 51 and the detection system 53 may be arranged directly in the radiation beam from the polarising beam splitter 48. The detection signal 57 generated by the detection system 53 is processed in a signal processor 58 to form a transverse error signal. The transverse error signal represents the transverse distance between the focus 27 and the centre of the track of the record carrier being scanned. The transverse error signal may be formed in any known way, for instance by means of the so-called push-pull method or the so-called DPD method. The transverse servo controller 58 outputs a transverse control signal 59 that controls an actuator 60 by moving the objective system 25 in a transverse direction, which is the radial direction if a disc-shaped record carrier is used. This movement changes the position of the focus 27 in the plane of the information layer in a direction perpendicular to the tracks. The detection system, the signal processor, the transverse servo controller and the actuator together form a transverse servo. When the transverse servo operates in closed loop, it keeps the focus 27 on the centre of the track during scanning of the information layer.

The non-polarising beam splitter 16 forms a second detection beam 65 by splitting off part of the component of the returning beam 45 having the first state of polarisation that has been transmitted by the polarising beam splitter 17. This component is primarily caused by reflection of the radiation beam 22 on the exit face 26 of the objective system 25. This so-called induced component has, on exiting the objective system 25, a state of polarisation perpendicular to the state of polarisation of the radiation beam 22 incident on the objective system. The amplitude of the induced component depends on the amount of evanescent coupling between the SIL 39 and the record carrier 1, 30. The second detection beam 65 is used in a second detection branch, including a detection lens 66 for converging the detection beam 65 an a third detection system 67. The second detection branch may generate a gap error signal and/or one or more tilt signals, as explained in the following paragraphs.

Figure 3:
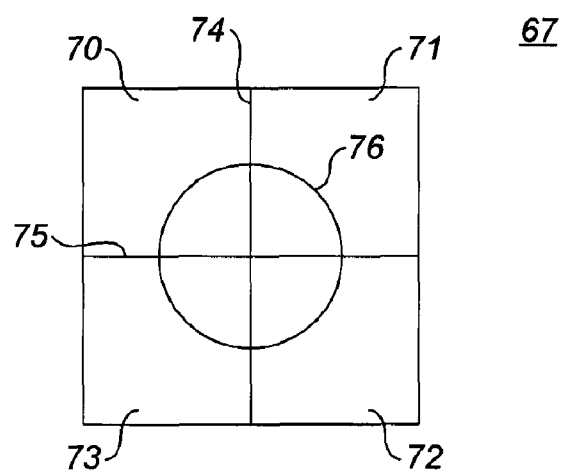
FIG. 3 shows a detection system for the induced component.

FIG. 3 shows the third detection system 67 for the induced component. The detection system is of the quadrant-type, having four detectors 70-73 separated by perpendicular dividing lines 74 and 75 and arranged as shown in the Figure. The second detection beam forms a spot 76 on the detection system. Each detector forms a detector signal, which detector signals 68 that are input in a signal processor 77. The signal processor forms a sum signal S70+S71+S73+S74 of the four detector signals, where SX is the detector signal of detector X. The sum signal is a measure of the total amount of radiation in the induced component. Since the total amount of radiation is also a measure for the amount of evanescent coupling, which depends on the height of the gap 41, the sum signal is a measure for the gap height and can be used for controlling the gap height. If the radiation power of the radiation source is not maintained at a constant level, the sum may be normalised by a signal representing the radiation power emitted by the radiation source. The scanning device of FIG. 1 may generate this signal by a forward-sense branch comprising a detection lens 80 and a fourth detection system 81. The non-polarising beam splitter 16 couples out part of the radiation beam 12 from the radiation source 11 as a third detection beam 82. The detection lens 80 converges the third detection beam on the fourth detection system 81. The detection system generates a first power signal 83 representing the power emitted by the radiation source 11. The sum signal normalised by the first power signal is output by the signal processor 77 as a normalised sum signal 78.

The normalised sum signal 78 is input to a gap servo controller 84. The gap servo controller is connected to a controller 95 for the controller to control the gap servo and to receive values of the gap height from the gap servo controller. The gap servo controller subtracts a signal 85 having a predetermined value obtained from the controller 95 from the normalised sum signal, thereby forming a gap-error signal as disclosed in patent U.S. Pat. No. 6,717,896. The gap servo controller uses the gap-error signal to form a gap-height control signal 86. The gap-height control signal controls the actuator 60 by moving the objective system 25 in an axial direction. The detection system 67, the gap servo controller and the actuator together form a gap-height servo or gap servo. When the gap servo operates in closed loop, it keeps the height of the gap 41 at a constant value determined by the predetermined value of the signal 85. The signal 85 is a set-point for the gap servo.

The signal processor 77 also forms a first tilt signal 87 and a second tilt signal 88 from the detector signals 68 by forming (S70+S73)−(S71+S72) for the first tilt signal, which represents the tilt about a tangential direction with respect to the track being scanned, and (S70+S71)−(S72+S73) for the second tilt signal, which represents the tilt about the transverse direction. The tilt signals may be normalised by the sum signal of the four detectors to make the tilt signals independent of the total radiation power incident on the detection system 67. The detection system 67 and the signal processor 77 form a tilt measuring system.

The first tilt signal 87 and the second tilt signal 88 are input in a first tilt servo controller 89 and a second tilt servo controller 90, respectively. The controllers form each a tilt control signal 91 and 92 for controlling the actuator 60. Each of the tilt servo controllers is connected to the controller 95 for control of the servos and for returning values of the tilt for further processing. The actuator may control the tilt of the objective system by piezo's or another electromechanical contraption. When the tilt servos operate in closed loop, the tilt angle in two directions between the objective system and the record carrier is minimised. Further details about the measurement of the tilt and the actuator are disclosed in patent application WO 2007/004141.

Figure 4:
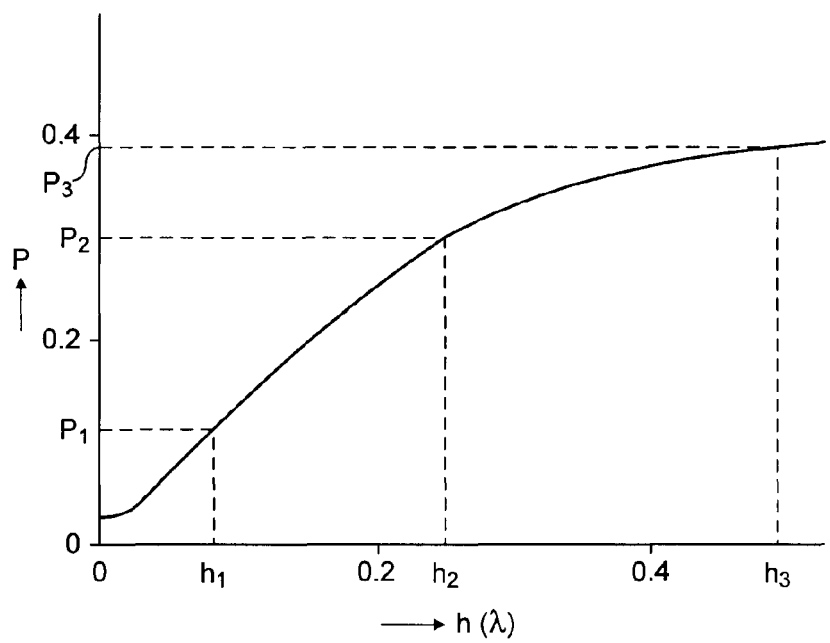
FIG. 4 shows a graph of the power in the induced signal versus the gap height.

FIG. 4 shows a graph of power P versus gap height h. The power P is the power in the induced component returning from the objective system 25, normalised by the power of the radiation beam 22 incident on the objective system. The gap height h is expressed in units of wavelength. The graph represents the behaviour of the induced component for a specific objective system having a numerical aperture NA of 1.45 and operating at a wavelength of 405 nm. The normalised sum signal 78 may represent the value of P.

When the scanning device writes information on the record carrier in the write mode, the controller 95 outputs the signal 85 having a predetermined value corresponding to power P1 in FIG. 4. The gap servo will control the gap-height such that that the induced component will approach P1. The corresponding gap height is indicated by h1. The value of h1 is about $0.073 \lambda$, or 30 nm when the wavelength is 405 nm. This predetermined gap height provides a relatively high coupling efficiency, which is advantageous when writing information in the information layer of a record carrier.

Figure 5:
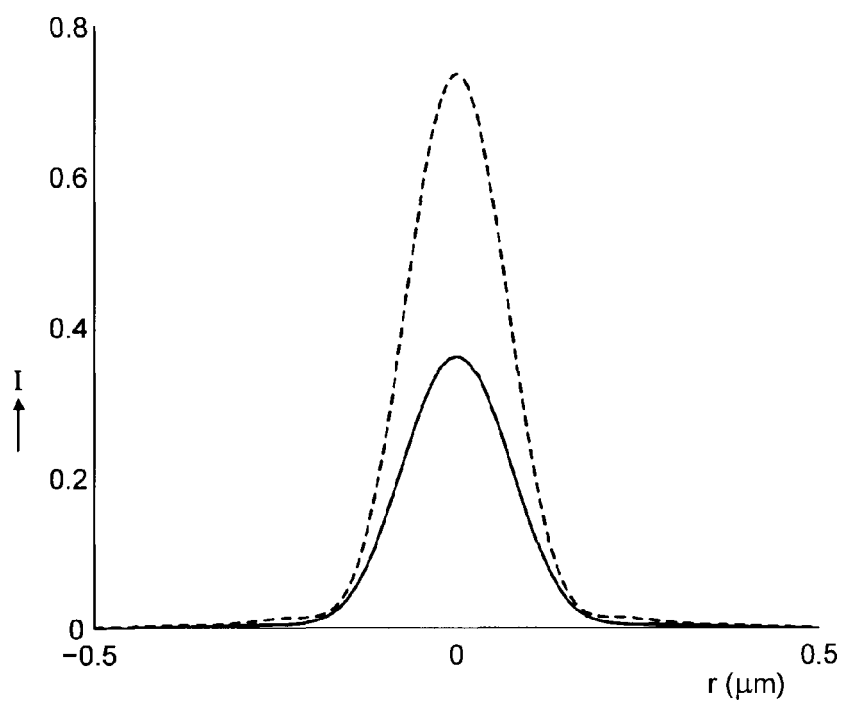
FIG. 5 shows an intensity profile of the focus for two different gap heights.

When the scanning device reads information from the record carrier in the read mode, the controller 95 outputs the signal 85 having a predetermined value corresponding to power P2 in FIG. 4. The corresponding gap height is indicated by h2. The value of h2 is about $0.25 \lambda$, or 100 nm when the wavelength is 405 nm. FIG. 5 shows the intensity profile of the focus for this gap height as a drawn line in the graph. The graph gives the intensity of the focus in arbitrary units as a function of the radius in the plane of the focus. The radius is measured in units of micrometer and zero radius coincides with the centre of the focus 27. The dashed line in FIG. 5 is the intensity profile of the focus for a gap height of 30 nm. The Figure shows that an increase of the gap height from 30 to 100 nm decreases the power in the spot by about a factor of about 2. However, the increase in gap height does hardly change the intensity profile of the focus. The Full Width at Half Maximum size (FWHM) of the intensity profile is approximately the same for the two gap heights.

The power of the radiation beam emitted by the radiation source 11 during reading is set at a value to obtain a power in the focus 27 just below Pmax, i.e. the maximum power for reading, as set out above. Since the emitted power is higher than in the known scanning devices using evanescent coupling, the RIN of the radiation source is higher and the SNR of the information signal is higher.

When the scanning device seeks another track on the record carrier in the seek mode, the controller 95 outputs the signal 85 having a predetermined value corresponding to power P3 in FIG. 4. The corresponding gap height is indicated by h3. The value of h3 is about $0.5 \lambda$, or 200 nm when the wavelength is 405 nm. When the focus 27 has arrived at the desired track, the gap height is reduced to h2 to allow reading of information stored in the track during the scanning delay step, in which step the desired location on the track must be found. When the focus is at the desired location, the process of reading, writing or erasing may commence. When information is to be written on the track, the gap height should be set to h1. To avoid delay in that case, the gap height should be set to h1 during the scanning delay step; the gap height may be set to h1 during the entire scanning delay step.

Although the above modes of operation discussed with reference to FIG. 4 use three different predetermined gap heights, it is also possible to use two or four or more different predetermined gap heights. When using two different gap heights, the smaller height may be used for the writing mode and the larger one for the reading and seeking mode; alternatively, the smaller height may be used for the writing and/or reading mode and the larger one for the seeking mode. The smaller height may also be used for the reading mode and the larger height for the seeking mode, which is useful for a scanning device of the read-only type.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An optical scanning device for scanning a record carrier, said record carrier having an outer face, wherein said optical scanning device comprises:
    a radiation source for generating a radiation beam;
    an objective system for converging the radiation beam to a focus, the objective system having an exit face arranged for evanescent coupling of the radiation beam between the exit face and the outer face; and
    a gap servo for maintaining a distance between the exit face and the outer face at a first gap height when writing information on the record carrier and at a second gap height when reading recorded information from the record carrier, wherein the first gap height and the second gap height are different values.

2. The optical scanning device according to claim 1, wherein the first gap height is smaller than the second gap height.

3. The optical scanning device according to claim 1, wherein the gap servo further maintains the distance between the exit face and the outer face at a third gap height for seeking a scanning position of the focus on the record carrier, the first gap height is smaller than the second gap height, and the second gap height is smaller than or equal to the third gap height.

4. A method for scanning an optical record carrier, comprising the following steps:
    converging a radiation beam to a focus by an objective system, the radiation beam being evanescent coupled between an exit face of the objective system and an outer face of the record carrier;
    maintaining a distance between the exit face and the outer face at a first gap height when writing information on the record carrier and at a second gap height when reading recorded information from the record carrier, wherein the first gap height and the second gap height are different values.

* * * * *